US008913045B2

(12) United States Patent
Son et al.

(10) Patent No.: US 8,913,045 B2
(45) Date of Patent: Dec. 16, 2014

(54) GATE DRIVE CIRCUIT FOR DISPLAY DEVICE

(75) Inventors: Mi-Young Son, Uijeongbu-si (KR); Hong-Jae Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1058 days.

(21) Appl. No.: 12/884,771

(22) Filed: Sep. 17, 2010

(65) Prior Publication Data

US 2011/0074743 A1 Mar. 31, 2011

(30) Foreign Application Priority Data

Sep. 25, 2009 (KR) ........................ 10-2009-0091236

(51) Int. Cl.

*G06F 3/038* (2013.01)
*G09G 5/00* (2006.01)
*G09G 3/20* (2006.01)

(52) U.S. Cl.

CPC .......... *G09G 3/20* (2013.01); *G09G 2300/0426* (2013.01); *G09G 2310/0267* (2013.01); *G09G 2310/0286* (2013.01); *G09G 2320/0223* (2013.01)

USPC ........... 345/204; 345/205; 345/211; 345/212; 345/213; 345/214; 345/215

(58) Field of Classification Search

None

See application file for complete search history.

(56) References Cited

U.S. PATENT DOCUMENTS 6,104,465 A * 8/2000 Na et al. ........................ 349/152
2006/0114209 A1* 6/2006 Kim et al. ....................... 345/94
2007/0229433 A1* 10/2007 Jang ................................ 345/96
2008/0018572 A1* 1/2008 Shin et al. ....................... 345/87
2009/0115690 A1* 5/2009 Chang et al. .................... 345/55

FOREIGN PATENT DOCUMENTS

KR 1020070056553 A 6/2007
KR 1020080000199 A 1/2008
KR 1020080008795 A 1/2008
KR 1020080097620 A 11/2008

OTHER PUBLICATIONS

Office Action issued in corresponding Korean Patent Application No. 10-2009-0091236, mailed May 2, 2013.

* cited by examiner

*Primary Examiner* — Jason Olson
*Assistant Examiner* — Stephen T Reed
(74) *Attorney, Agent, or Firm* — Brinks Gilson & Lione

(57) ABSTRACT

A gate drive circuit for a display device is disclosed, by which output states of scan pulses are identically maintained in a manner of minimizing load deviation between connecting units. The present disclosure includes at least two clock transmission lines transmitting at least two clock pulses having a phase difference in-between, a shift register outputting scan pulses sequentially based on the clock pulses transmitted from the clock transmission lines, and a plurality of connecting units connecting the clock transmission lines to the shift register, respectively, wherein at least one of the connecting units is zigzagged in part, the at least one connecting unit comprising: a pad connected to the corresponding clock transmission line via a pad connecting unit; a zigzagged line connected to one side of the pad; and a connecting line that has one side connected to the zigzagged line and the other side connected to the shift register.

11 Claims, 6 Drawing Sheets

(a)

(b)

GATE DRIVE CIRCUIT FOR DISPLAY DEVICE

This application claims the benefit of Korea Patent Application No. 10-2009-0091236, filed on Sep. 25, 2009, the entire contents of which is incorporated herein by reference for all purposes as if fully set forth herein.

BACKGROUND

1. Field of the Invention

The present disclosure relates to a gate, and more particularly, to a gate drive circuit for a display device. Although the present disclosure is suitable for a wide scope of applications, it is particularly suitable for maintaining output states of scan pulses identically by minimizing load deviation between connecting units.

2. Discussion of the Related Art

Generally, a gate drive circuit generates scan pulses using a plurality of clock pulses differing from each other in phase. The gate drive circuit includes a plurality of clock transmission lines for carrying clock pulses and a shift register generating to output scan pulses using the clock pulses from the clock transmission lines.

Each of the clock transmission lines is connected to the shift register via a connecting unit. Since a distance between the shift register and each of the clock transmission lines varies, a length between the connecting units varies as well. This generates a load difference between the connecting units. The load difference causes an inter-clock pulse ascending time deviation and an inter-clock pulse descending time deviation between the clock pulses outputted from the corresponding clock transmission lines, respectively. Therefore, an ascending time deviation and a descending time deviation increase between scan pulses outputted based on the clock pulses.

However, as the scan pulses drive gate lines of a display device, if the deviation between the scan pulses increases, it is unable to avoid the degradation of image quality.

BRIEF SUMMARY

A gate drive circuit for a display device according to the present disclosure includes at least two clock transmission lines that transmit at least two clock pulses having a phase difference in-between, a shift register that output scan pulses sequentially based on the clock pulses transmitted from the clock transmission lines, and a plurality of connecting units that connect the clock transmission lines to the shift register, respectively. At least one of the connecting units is zigzagged in part.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DRAWINGS AND THE PRESENTLY PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
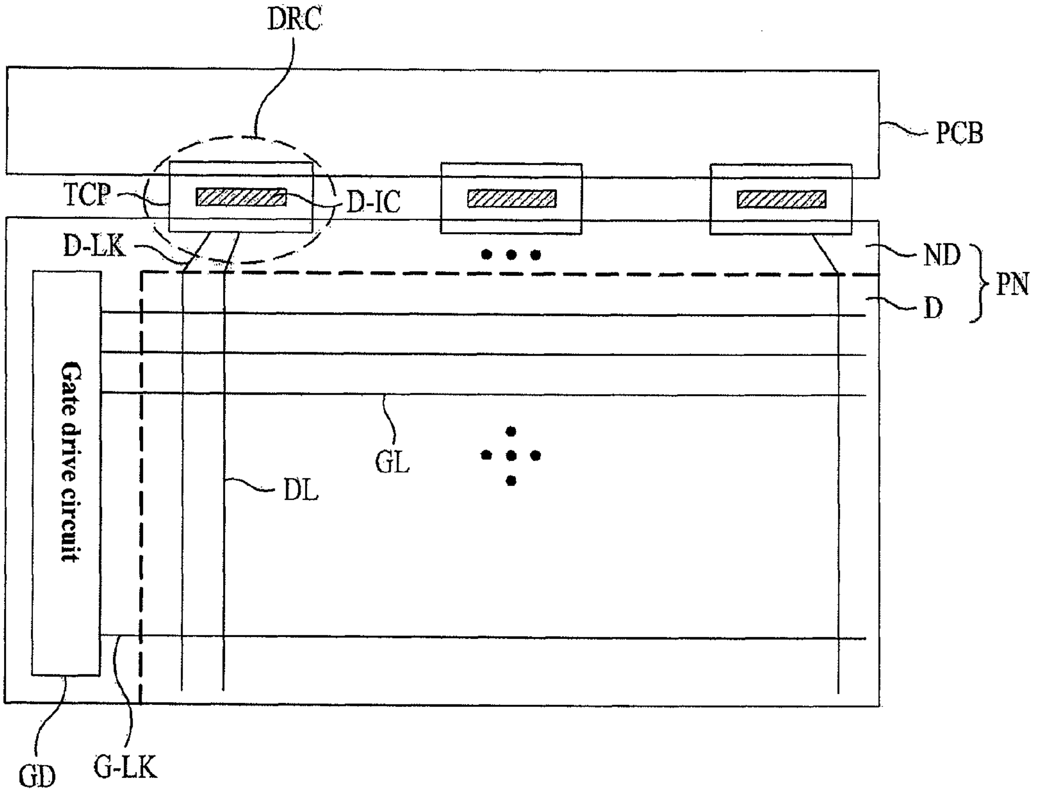
FIG. 1 is a layout of a display device according to a first embodiment of the present disclosure.

FIG. 1 is a layout of a display device according to a first embodiment of the present disclosure.

Referring to FIG. 1, a display device mainly includes a panel PN having a display unit D configured to display an image and a non-display unit ND configured to enclose the display unit D and a data drive circuit DRC having a data drive integrated circuit D-IC generating various kinds of signals required for displaying the image on the display unit D of the panel PN and a surface-mounted tape carrier package (TCP) packaging the data drive integrate circuit D-IC.

In this case, the surface-mounted tape carrier package can include a tape carrier package (TCP).

One side of the data drive circuit DRC is connected to a printed circuit board PCB, while the other side of the data drive circuit is connected to the non-display unit ND of the panel PN. This panel PN can include a panel having liquid crystals, a panel having organic light emitting diodes or the like.

The printed circuit board PCB is connected to an external system (not shown in the drawing). Video data and various controls signals from the external system are supplied to the data drive circuit DRC and a gate drive circuit GD via the printed circuit board PCB.

A plurality of gate and data lines GL and DL crossing with each other and pixels for displaying images according to gate signals from the gate lines GL and video data from the data lines DL are formed in the display unit D of the panel PN.

A plurality of data link lines D-LK for transmitting the video data from the drive circuit DRC to the data lines DL and a plurality of gate link lines G-LK for transmitting the gate signals from the drive circuit to the gate lines GL are formed in the non-display unit ND of the panel PN.

The gate lines GL are driven by the gate drive circuit GD. For this, the gate drive circuit outputs scan pulses Vout1 to Voutn in order and then supplies the scan pulses Vout1 to Voutn to the gate lines GL sequentially.

The gate drive circuit GD of the present disclosure is provided to the non-display unit ND of the panel PN shown in FIG. 1.

The gate drive circuit GD is explained in detail as follows.

Figure 2:
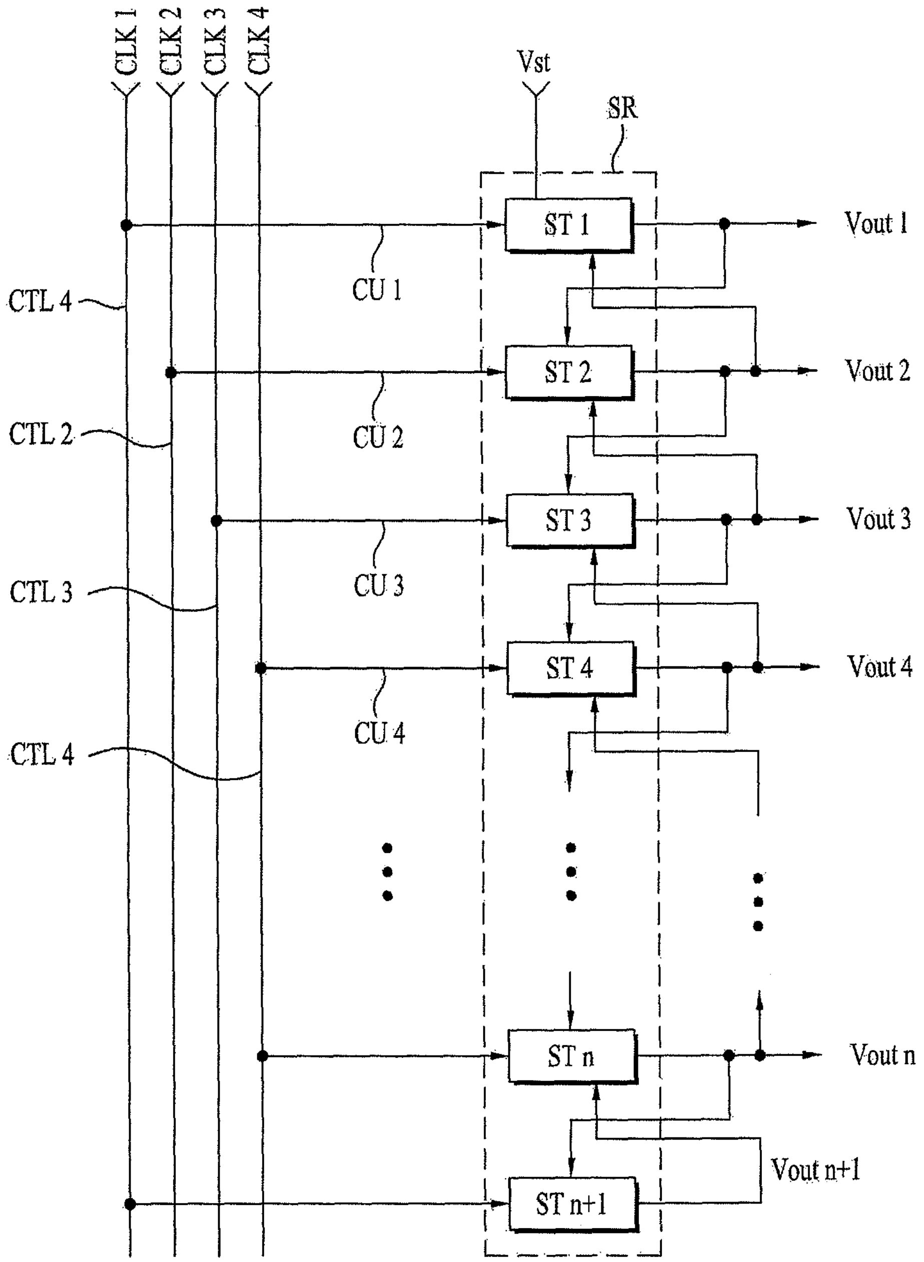
FIG. 2 is a diagram of a gate drive circuit shown in FIG. 1.

FIG. 2 is a diagram of a gate drive circuit shown in FIG. 1.

Referring to FIG. 2, a gate drive circuit GD according to the present disclosure includes at least two clock transmission lines CTL1 to CTL4 transmitting at least two clock pulses CLK1 to CLK4 having different phase differences, respectively, a shift register SR outputting scan pulses Vout1 to Voutn sequentially based on the clock pulses CLK1 to CLK4 from the clock transmission lines CTL1 to CTL4, and a plurality of connecting units CU1 to CU4 configured to connect the clock transmission lines CTL1 to CTL4 to the shift register SR, respectively. In particular, according to the present disclosure, at least one of the connecting units is zigzagged in part.

The shift register SR includes a plurality of stages ST1 to STn and a dummy stage STn+1. Each of the stages ST1 to STn is set in response to a scan pulse from a antecedent stage. Afterwards, the set stage is supplied with a clock pulse from a corresponding clock transmission line and then supplies a scan pulse to a corresponding gate line GL to activate. Having outputted the scan pulse, the stage is reset in response to a scan pulse from a next stage. This reset stage supplies a base voltage to the corresponding gate line GL to deactivate.

Meanwhile, the first stage ST1, which first outputs a scan pulse among the stages ST1 to STn, is set in response to a start pulse Vst from a timing controller. The dummy stage STn+1 is reset in response to the start pulse Vst. The dummy stage STn+1 outputs a dummy scan pulse Voutn+1 for resetting the $n^{th}$ stage STn that last outputs a scan pulse among the stages ST1 to STn. This dummy scan pulse Voutn+1 is not supplied to a gate line GL but is supplied to the $n^{th}$ stage Stn only.

There can exist at least two clock transmission lines CTL1 to CTL4. The present disclosure proposes four cock transmission lines CTL1 to CTL4 carrying four kinds of clock pulses CLK1 to CLK4 having different faces, respectively, for example.

Referring to FIG. 2, the first to fourth clock transmission lines CTL1 to CTL4 carry first to fourth clock pulses CLK1 to CLK4 having different phases, respectively. In particular, the first clock transmission line CTL1 carries the first clock pulse CLK1, the second clock transmission line CTL2 outputs the second clock pulse CLK2 having a phase delayed than that of the first cock pulse CLK1, the third clock transmission line CTL3 outputs the third clock pulse CLK3 having a phase delayed that the second clock pulse CLK2, and the fourth clock transmission line CTL4 outputs the fourth clock pulse CLK4 having a phase delayed than the third clock pulse CLK3. As the first to fourth clock pulses CLK1 to CLK4 are cyclically outputted with the aforesaid phase differences, the first clock pulse CLK1 has a phase delayed than the fourth clock pulse. Meanwhile, the start pulse Vst can be outputted by being synchronized with the fourth clock pulse CLK4. Yet, each of the first to fourth clock pulses CLK to CLK4 can be outputted plural times in one frame, whereas the start pulse Vst is outputted once only in one frame.

Thus, when the shift register SR of the present disclosure is operating by 4-phase clock pulses, a $(4p+1)^{th}$ stage is supplied with the first clock pulse CLK1, a $(4p+2)^{th}$ stage is supplied with the second clock pulse CLK2, a $(4p+3)^{th}$ stage is supplied with the third clock pulse CLK3, and a $(4p+4)^{th}$ stage is supplied with the fourth clock pulse CLK4. In this case, the p is 0 or a natural number.

In case that the shift register SR of the present disclosure is driven by the same method using 6-phase clock pulses, a $(6p+1)^{th}$ stage is supplied with a first clock pulse CLK1, a $(6p+2)^{th}$ stage is supplied with a second clock pulse CLK2, a $(6p+3)^{th}$ stage is supplied with a third clock pulse CLK3, a $(6p+4)^{th}$ stage is supplied with a fourth clock pulse CLK4, a $(6p+5)^{th}$ stage is supplied with a fifth clock pulse CLK5, and a $(6p+6)^{th}$ stage is supplied with a sixth clock pulse CLK6.

The clock transmission lines CTL1 to CTL4 and the connecting units CU1 to CU4 are explained in detail as follows.

Figure 3:
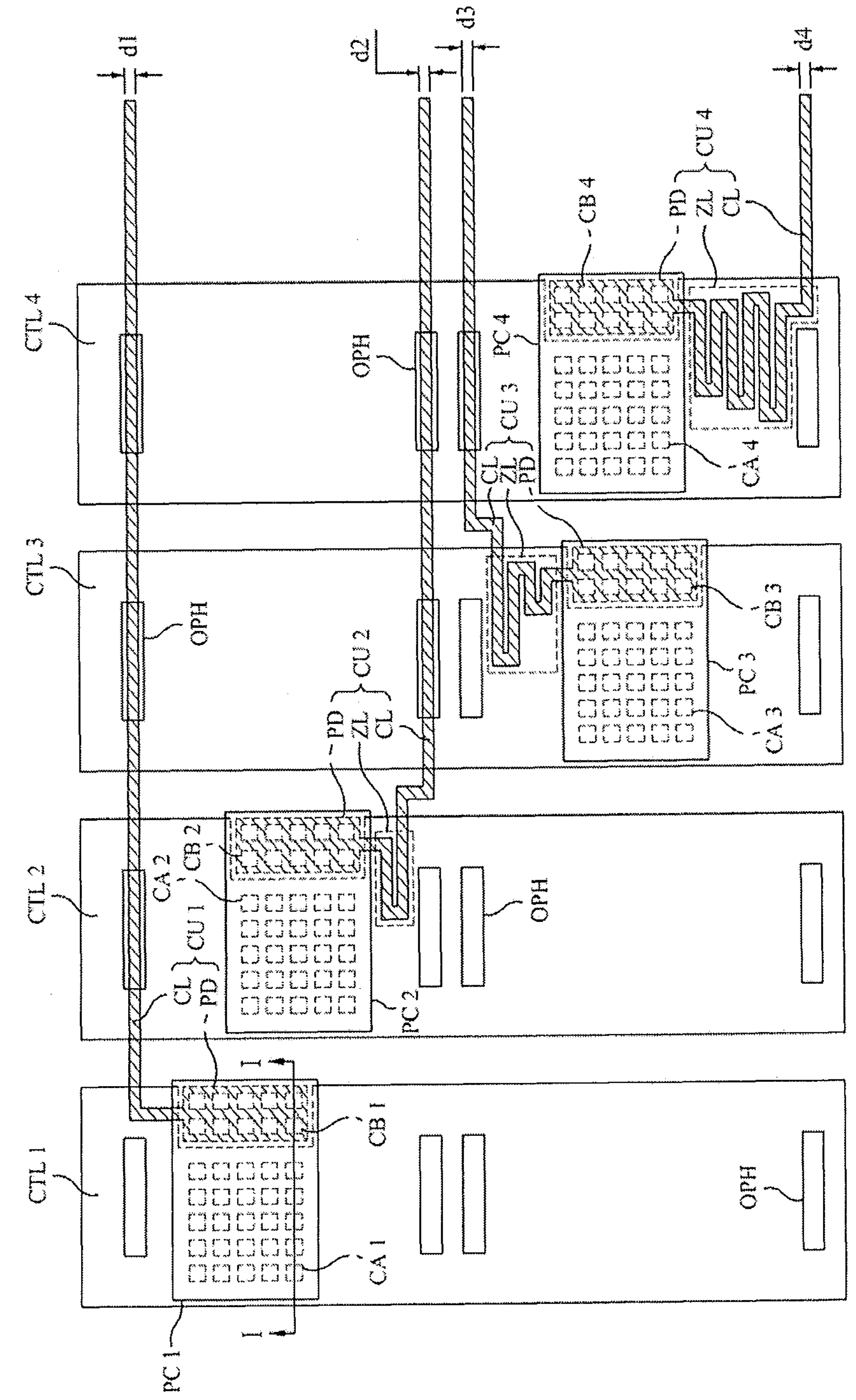
FIG. 3 is a detailed layout of clock transmission lines and connecting units shown in FIG. 2.

FIG. 3 is a detailed layout of clock transmission lines (CTL1 to CTL4) and connecting units shown in FIG. 2.

Referring to FIG. 3, at least one connecting unit includes a pad PD, a zigzag line ZL and a connecting line CL.

The pad PD is connected to a corresponding clock transmission line (one of CTL1 to CTL4) and the zigzag line ZL is connected to one side of the pad PD. One side of the connecting line CL is connected to the zigzag line ZL and the other side is connected to one of the stages ST1 to STn+1 provided to a shift register SR. This pad PD is connected to the corresponding clock transmission line via a pad connecting unit (one of PC1 to PC4). In particular, a portion of the pad connecting unit is connected to a portion of a corresponding clock transmission line exposed through a plurality of first contact holes (one of CA1 to CA4) and another portion of the pad connecting unit is connected to the pad PD exposed through a plurality of second contact holes (one of CB1 to CB4).

In particular, referring to FIG. 3, the connecting units CU2 to CU4 connected to the rest of the clock transmission lines CTL2 to CTL4 except the first connecting unit CU1 connected to the first clock transmission line CTL1 farthest from the shift register SR among a plurality of the clock transmission lines CTL1 to CTL4 include the zigzag lines ZL.

For instance, referring to FIG. 3, as the first to fourth clock transmission lines CTL1 to CTL4 are arranged in order, the first connecting unit CU1 connected to the first clock transmission line CTL1 located farthest from the shift register SR among the first to fourth clock transmission lines CTL1 to CTL4 does not include the zigzag line ZL. Namely, the first clock transmission line CTL1 includes the pad PD and the connecting line CL. On the contrary, as mentioned in the above description, each of the second to fourth clock transmission lines CTL2 to CTL4 includes the pad PD, the zigzag line ZL and the connecting line CL.

Since the clock transmission lines CTL1 to CTL4 include first to $k^{th}$ clock transmission lines arranged in order, where the k is a natural number equal to or greater than 2. The greater k value the clock transmission line has, the closer to the shift register it is located. If the clock transmission line has a grater k value, it is located closer to the shift register SR. In this case, the connecting line CL connected to an $i^{th}$ clock transmission line is connected to the shift register SR in a manner of being overlapped with $(i+1)^{th}$ to $k^{th}$ clock transmission lines in part, where the i is a natural number smaller than the k. For instance, referring to FIG. 3, the connecting line CL of the first connecting unit CU1 connected to the first clock transmission line CTL1 is connected to a first stage ST1 within the shift register SR in a manner of being overlapped with the second to fourth clock transmission lines CTL2 to CTL4 in part, the connecting line CL of the second connecting unit CU2 connected to the second clock transmission line CTL2 is connected to a second stage ST2 within the shift register SR in a manner of being overlapped with the third and fourth clock transmission lines CTL3 and CTL4 in part, the connecting line CL of the third connecting unit CU3 connected to the third clock transmission line CTL3 is connected to a third stage ST3 within the shift register SR in a manner of being overlapped with the fourth clock transmission line CTL4 in part, and the connecting line CL of the fourth connecting unit CU4 connected to the fourth clock transmission line CTL4 is directly connected to a fourth stage ST4 within the shift register SR.

An overlapping preventing hole OPH is provided to a portion of each of the $(i+1)^{th}$ to $k^{th}$ clock transmission lines overlapped with the connecting line CL of the connecting unit connected to the $i^{th}$ clock transmission line in a manner of perforating the corresponding portion. For instance, if k clock transmission lines exist and one of the k clock transmission lines is an $i^{th}$ clock transmission line, overlapping preventing holes OPH are formed at portions of the $(i+1)^{th}$ to $k^{th}$ clock transmission lines overlapped with the connecting line CL of the connecting unit connected to the $i^{th}$ clock transmission line in a manner of perforating the corresponding portions, respectively. For example, referring to FIG. 3, since the connecting line CL of the first connecting unit CU1 connected to the first clock transmission line CTL1 is overlapped with portions of the second to fourth clock transmission lines CTL2 to CTL4, overlapping preventing holes OPH are formed at the overlapped portions of the second to fourth clock transmission lines CTL2 to CTL4 in a manner of perforating the overlapped portions, respectively. Meanwhile, since a plurality of overlapping preventing holes OPH are formed at other portions of the clock transmission lines CTL1 to CTL4 as well as the overlapped portions, the same number of overlapping preventing holes OPH are formed at each of the clock transmission lines CTL1 to CTL4. Therefore, each of the clock transmission lines CTL1 to CTL4 can have the same resistance.

The overlapping preventing hole OPH minimizes a size of parasitic capacitor formed between the clock transmission line and the connecting line by minimizing the overlapped portion between the clock transmission line and the connecting line, thereby preventing signal interference between the clock transmission line and the connecting line.

Specifically, the connecting unit connected to the clock transmission line closer to the shift register SR has the zigzag line ZL having a longer length. For instance, referring to FIG. 3, the first connecting unit CU1 connected to the first clock transmission line CTL1 located farthest from the shift register SR does not include the zigzag line ZL at all, the zigzag line ZL of the second connecting unit CU2 connected to the second clock transmission line CTL2 located second farthest from the shift register SR has the shortest length, and the zigzag line ZL of the fourth connecting unit CU4 connected to the fourth clock transmission line CTL4 located closest to the shift register SR has the longest length. The length of the zigzag line ZL of the third connecting unit CU3 connected to the third clock transmission line CTL3 is smaller than that of the zigzag line ZL of the fourth connecting unit CU4. The length of the zigzag line ZL of the second connecting unit CU2 connected to the second clock transmission line CTL2 is smaller than that of the zigzag line ZL of the third connecting unit CU3.

As a method of differentiating a length difference between zigzag lines ZL of the connecting units CU1 to CU4, it is able to propose a method of adjusting the number of recessed portions of each zigzag line ZL. In particular, if a connecting unit is connected to a clock transmission line closer to a shift register SR, the zigzag line ZL can be set to have more recessed portions. For instance, referring to FIG. 3, the first connecting unit CU1 connected to the first clock transmission line CTL1 located farthest from the shift register SR does not include a zigzag line at all, the zigzag line ZL of the second connecting unit CU2 connected to the second clock transmission line CTL2 located second farthest from the shift register SR next to the first clock transmission line CTL1 has a single recessed portion, the zigzag line ZL of the third connecting unit CU3 connected to the third clock transmission line CTL3 located third farthest from the shift register SR next to the second clock transmission line CTL2 has three recessed portions, and the zigzag line ZL of the fourth connecting unit CU4 connected to the fourth clock transmission line CTL4 located closest to the shift register SR has five recessed portions.

Thus, according to the present disclosure, the load difference between the connecting units CU1 to CU4, which is attributed to the different distance difference between the shift register SR and each of the clock transmission lines CTL1 to CTL4, can be minimized using the zigzag lines ZL differing from each other in length. Therefore, even if each of the clock transmission lines CTL1 to CTL4 is located in a different distance from the shift register SR, each of the clock pulses CLK1 to CLK4 supplied to the stages ST1 to STn within the shift register SR has the almost same state. In particular, a rising time, a falling time and distorted extent of each of the clock pulses CKL1 to CLK4 is maintained almost equal.

In this case, each of the zigzag line ZL is provided over the clock transmission line to be overlapped with the clock transmission line connected to the connecting unit including the corresponding zigzag line only. For instance, the zigzag line ZL of the first connecting unit CU1 is formed over the first clock transmission line CTL1 to be overlapped with the first clock transmission line CTL1 connected to the first connecting unit CU1 only, the zigzag line ZL of the second connecting unit CU2 is formed over the second clock transmission line CTL2 to be overlapped with the second clock transmission line CTL2 connected to the second connecting unit CU2 only, the zigzag line ZL of the third connecting unit CU3 is formed over the third clock transmission line CTL3 to be overlapped with the third clock transmission line CTL3 connected to the third connecting unit CU3 only, and the zigzag line ZL of the fourth connecting unit CU4 is formed over the fourth clock transmission line CTL4 to be overlapped with the fourth clock transmission line CTL4 connected to the fourth connecting unit CU4 only.

Thus, the zigzag line is formed overlapped not with the rest of the clock transmission lines but with the clock transmission connected to itself only. Therefore, it is able to minimize the interference caused by the clock pulses CLK1 to CLK4 between the different clock transmission lines CTL1 to CTL4.

Moreover, according to the present disclosure, a size of each connecting line CL is differentiated to minimize a load difference between the connecting units CU1 to CU4, which is cased by a different distance difference between the shift register SR and each of the clock transmission lines CTL1 to CTL4. In particular, instead of using the above described zigzag line structure, a connecting unit connected to a clock transmission line closer to a shift register SR has a connecting line CL of which size is designed to decrease. Therefore, it is able to minimize the load difference between the connecting units CU1 to CU4. For instance, referring to FIG. 3, if a line width of a connecting line CL of a first connecting unit CU1 connected to a first clock transmission line CTL1 located farthest from a shift register SR is set to d1, a line width of a connecting line CL of a second connecting unit CU2 connected to a second clock transmission line CTL2 located second farthest from the shift register SR next to the first cock transmission line CTL1 is set to d2, a line width of a connecting line CL of a third connecting unit CU3 connected to a third clock transmission line CTL3 located third farthest from the shift register SR next to the second clock transmission line CTL2 is set to d3, and a line width of a connecting line CL of a fourth connecting unit CU4 connected to a fourth clock transmission line CTL4 located fourth farthest from the shift register SR next to the third clock transmission line CTL3 is set to d4, the relations among d1 to d4 can be defined as Formula 1.

$$d1>d2>d3>d4 \quad \text{[Formula 1]}$$

According to the relation represented as in Formula 1, although the clock transmission lines CTL1 to CTL4 are located in different distances from the shift register SR, the clock pulses CLK1 to CLK4 supplied to the stages ST1 to ST4 within the shift register SR have almost the same states, respectively.

Both of the above described two kinds of methods, i.e., the zigzag line structure and the connecting line size adjustment, are applicable to one display device.

Meanwhile, the clock transmission lines CTL1 to CTL4 have the following structures to prevent the pad connecting units PC1 to PC4 from being damaged.

Figure 4:
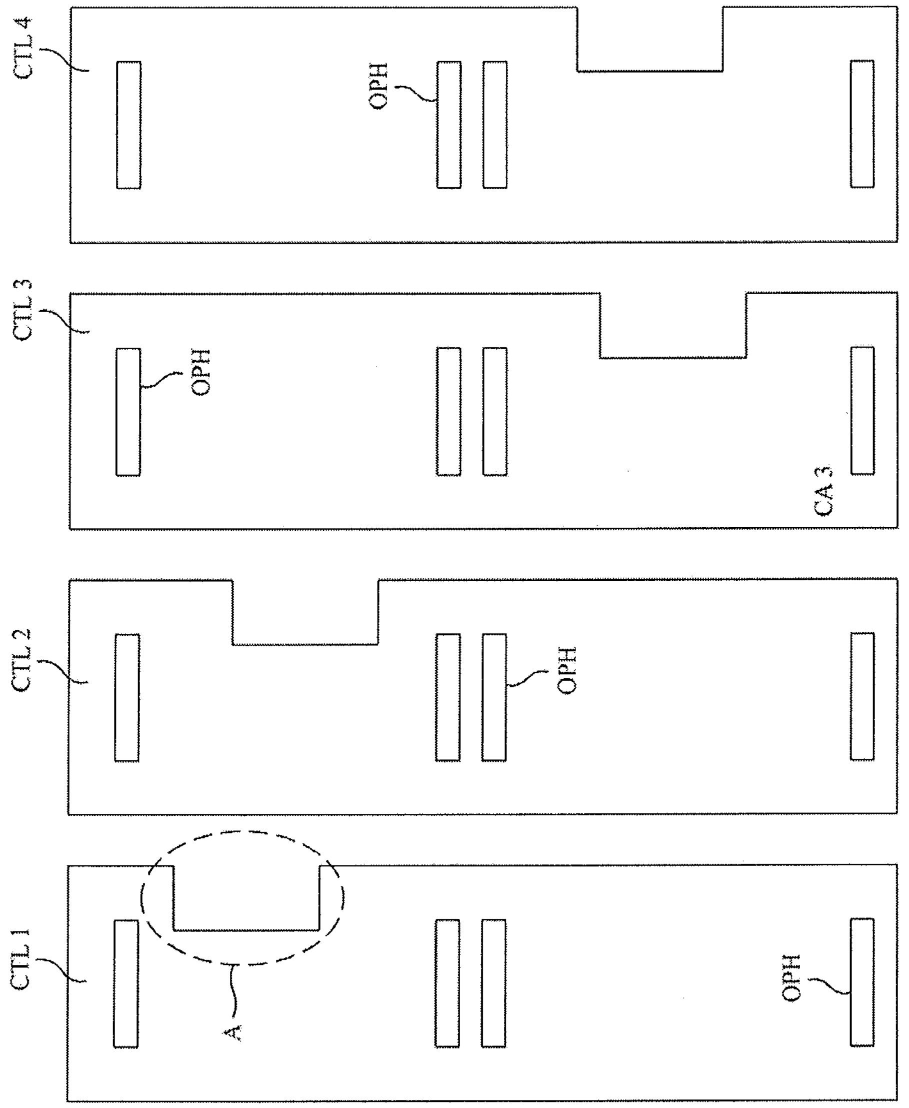
FIG. 4 is a layout of the click transmission lines shown in FIG. 3.
Figure 5:
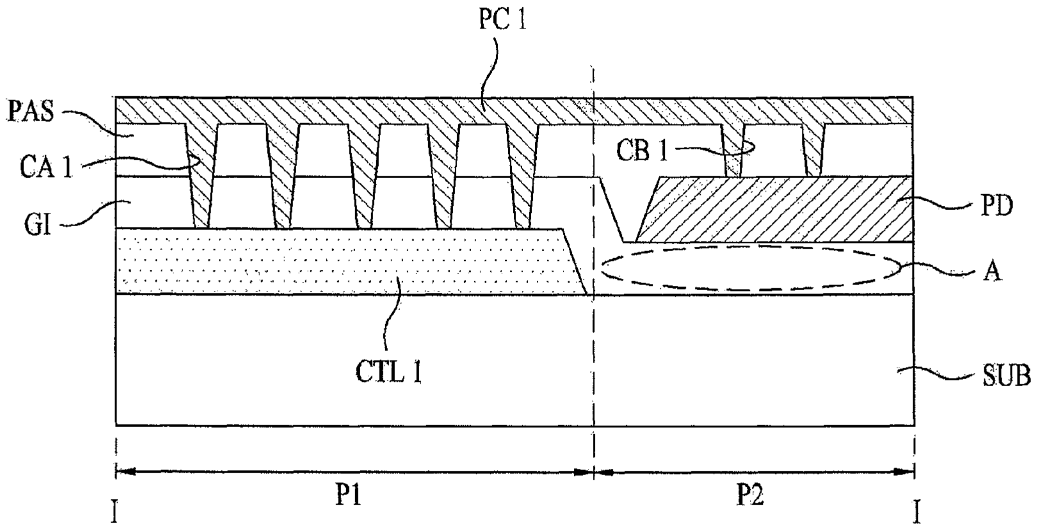
FIG. 5 is a cross-sectional diagram according to a cutting line I~I shown in FIG. 3.

FIG. 4 is a layout of the click transmission lines shown in FIG. 3. FIG. 5 is a cross-sectional diagram according to a cutting line I~I shown in FIG. 3.

Referring to FIG. 4 and FIG. 5, in 'A' of FIG. 5, a portion of a clock transmission line, which corresponds to an overlapped region between a pad PD and the clock transmission line, is removed. If so, referring to FIG. 5, it is able to prevent a step difference between a structure of a first region P1, in which the clock transmission line is located, and a structure of a second region P2, in which the pad PD is located. In particular, if the clock transmission line remains in the portion 'A' of the second region P2 instead of being removed, a height of the structure formed in the second region P2 including the pad part PD further than the first region P1 becomes greater than that of the structure formed in the first region P1, whereby a step difference is generated from a boundary between the structures of the first and second regions P1 and P2. If so, the pad connecting unit provided to the highest layers of the structures of the first and second regions P1 and P2 can be damaged by this step difference. In particular, if a serious crack is generated from a portion of the pad connecting unit corresponding to the boundary between the first and second regions P1 and P2, the pad connecting unit can be broken into two parts centering on the boundary. Once the pad connecting unit is broken, it is unable to deliver a clock pulse from the clock transmission line to a connecting unit.

Therefore, according to the present disclosure, a portion of the clock transmission line corresponding to the part 'A' of the second region P2 is removed to prevent the step difference between the first and second regions P1 and P2, whereby the pad connecting unit can be prevented from being damaged.

A substrate SUB, a gate insulating layer GI and a passivation layer in FIG. 5 are explained as follows.

First of all, the substrate SUB indicates a lower one of two substrates opposing each other. In this case, gate lines GL and data lines DL are formed on the lower substrate.

The gate insulating layer GI is formed on an entire surface of the substrate SUB including the clock transmission lines CTL1 to CTL4. And, a pad PD is formed on the gate insulating layer GI corresponding to the second region P2.

The passivation layer PAS is formed on an entire surface of the substrate SUB including pads PD. A plurality of first contact holes CA1 exposing the clock transmission line in part and a plurality of second contact holes CB1 exposing the pad PD in part are formed in the passivation layer PAS and the gate insulating layer GI.

The $(4q+1)^{th}$ connecting unit including the fifth connecting unit, which is not explained in this description, has the same configuration of the aforesaid first connecting unit CU1, the $(4q+2)^{th}$ connecting unit including the sixth connecting unit has the same configuration of the aforesaid second connecting unit CU2, the $(4q+3)^{th}$ connecting unit including the seventh connecting unit has the same configuration of the aforesaid third connecting unit CU3, and the $(4q+4)^{th}$ connecting unit including the eighth connecting unit has the same configuration of the aforesaid fourth connecting unit CU4. In this case, the q is a natural number equal to or greater than 2.

Figure 6:
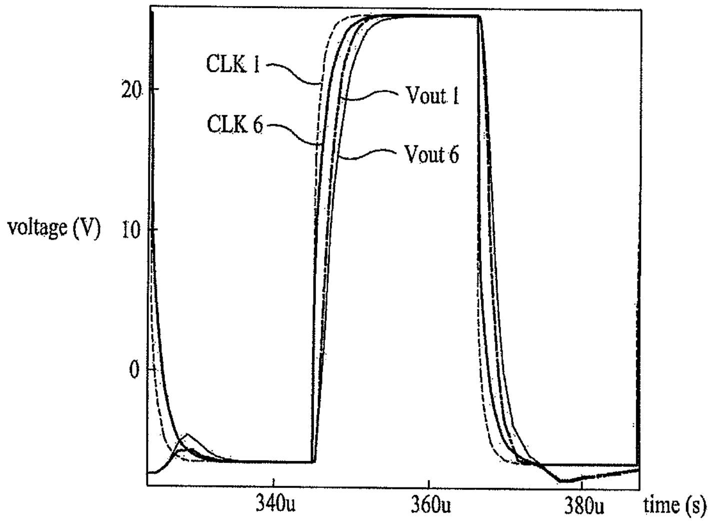
FIG. 6 is a diagram for explaining effects of the present disclosure.
Figure 6:
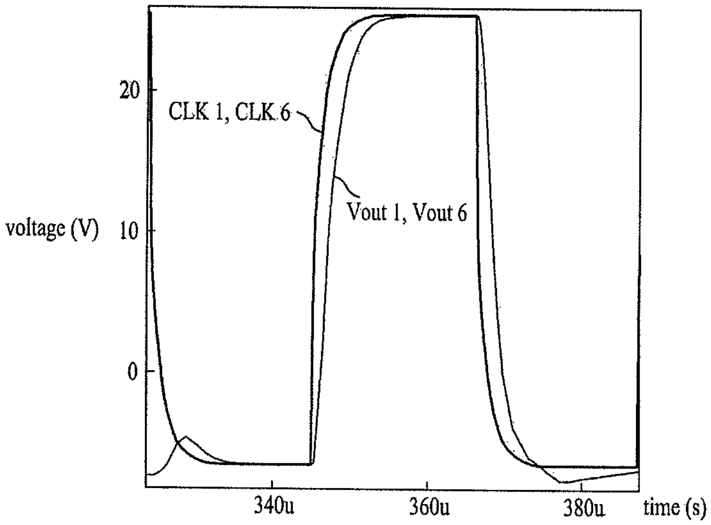

FIG. 6 is a diagram for explaining effects of the present disclosure. IN particular, FIG. 6 is a diagram for comparing clock pulses CLK1 to CLK4 inputted to a related art gate drive circuit GD and scan pulses Vout1 to Voutn outputted based on the clock pulses CLK1 to CLK4 to clock pulses CLK1 to CLK4 inputted to a gate drive circuit GD of the present disclosure and scan pulses Vout1 to Voutn outputted based on the clock pulses CLK1 to CLK4.

Referring to FIG. 6, each of the related art gate drive circuit GD and the gate drive circuit GD according to the present disclosure outputs scan pulses using 6-phase clock pulses. FIG. 6 (*a*) shows waveforms of first and sixth clock pulses CLK1 and CLK6 among 6-phase clock pulses inputted to the related art gate drive circuit GD, a waveform of a first scan pulse Vout1 outputted from the related art gate drive circuit GD by the first clock pulse CLK1 and a waveform of a sixth scan pulse Vout6 outputted from the related art gate drive circuit GD by the sixth clock pulse CLK6. FIG. 6 (*b*) shows waveforms of first and sixth clock pulses CLK1 and CLK6 among 6-phase clock pulses inputted to the present disclosure t gate drive circuit GD, a waveform of a first scan pulse Vout1 outputted from the present disclosure gate drive circuit GD by the first clock pulse CLK1 and a waveform of a sixth scan pulse Vout6 outputted from the present disclosure gate drive circuit GD by the sixth clock pulse CLK6.

Referring to FIG. 6 (*a*), according to the related art, rising and falling time deviations between the first and sixth clock pulses CLK1 and CLK6 outputted from the first and sixth clock transmission lines CTL1 and CTL6 having a greatest distance difference in-between among six clock transmission lines are considerably large. Yet, it can be observed that rising and falling time deviations between the first and sixth clock pulses CLK1 and CLK6 according to the present disclosure barely exist. Namely, it can be observed that the first and sixth clock pulses CLK1 and CLK6 of the present disclosure have the almost same states.

Likewise, Referring to FIG. 6 (*b*), according to the related art, rising and falling time deviations between the first and sixth scan pulses Vout1 and Vout6 outputted based on the first and sixth clock pulses CLK1 and CLK6 are considerably large. Yet, it can be observed that rising and falling time deviations between the first and sixth scan pulses Vout1 and Vout6 according to the present disclosure barely exist. Namely, it can be observed that the first and sixth scan pulses Vout1 and Vout6 of the present disclosure have almost the same states.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The invention claimed is:

1. A gate drive circuit for a display device, comprising:
at least two clock transmission lines that transmit at least two clock pulses having a phase difference in-between;
a shift register that outputs scan pulses sequentially based on the clock pulses transmitted from the clock transmission lines; and
a plurality of connecting units that connect the clock transmission lines to the shift register, respectively, wherein at least one of the connecting units connects a corresponding clock transmission line to the shift register, and the at least one connecting unit includes a zigzagged line that overlaps said corresponding clock transmission line.

2. The gate drive circuit of claim 1, the at least one connecting unit comprising: a pad connected to the corresponding clock transmission line via a pad connecting unit; the zigzagged line connected to one side of the pad; and a connecting line that has one side connected to the zigzagged line and the other side connected to the shift register.

3. The gate drive circuit of claim 2, wherein each of the connecting units connected to the rest of the clock transmission lines except the connecting unit connected to the clock transmission line located farthest from the shift register among the clock transmission lines includes the zigzagged line.

4. The gate drive circuit of claim 3, wherein the zigzagged line of the connecting unit connected to the clock transmission line closest to the shift register has a longer length.

5. The gate drive circuit of claim 3, wherein the zigzagged line of the connecting unit connected to the clock transmission line closest to the shift register has more recessed portions.

6. The gate drive circuit of claim 2, wherein the zigzagged line only overlaps said clock transmission line.

7. The gate drive circuit of claim 2, wherein the clock transmission lines includes 1.sup.st to k.sup.th clock transmission lines arranged in order, wherein k is a natural number equal to or greater than 2, wherein if the clock transmission line has a greater k value, the corresponding clock transmission line is located closer to the shift register, wherein the connecting line connected to the i.sup.th clock transmission line is connected to the shift register in a manner of being overlapped with the (i+1).sup.th to k.sup.th clock transmission lines in part, wherein the i is a natural number smaller than the k, and wherein an overlapping preventing hole is provided to a portion of each of the (i+1).sup.th to k.sup.th clock transmission lines overlapped with the connecting line of the connecting unit connected to the i.sup.th clock transmission line in a manner of perforating the corresponding portion.

8. The gate drive circuit of claim 2, wherein the pad is overlapped with the portion of the clock transmission line connected thereto and wherein the clock transmission line corresponding to a region having the pad and the clock transmission line overlapped therein is removed in part.

9. The gate drive circuit of claim 2, wherein if the connecting unit connected to the clock transmission line is closer to the shift register, a size of the connecting line of the connecting unit is further decreased.

10. A gate drive circuit for a display device, comprising:

at least two clock transmission lines that transmit at least two clock pulses having a phase difference in-between;

a shift register that outputs scan pulses sequentially based on the clock pulses transmitted from the clock transmission lines; and a plurality of connecting units that connect the clock transmission lines to the shift register, respectively, wherein at least one of the connecting unit includes a zigzagged line that overlaps said corresponding clock transmission line, and an overlap preventing hole is provided in a part of the transmission lines overlapped with connecting line of the connecting unit.

11. A gate drive circuit for a display device, comprising:

at least two clock transmission lines that transmit at least two clock pulses having a phase difference in-between;

a shift register that outputs scan pulses sequentially based on the clock pulses transmitted from the clock transmission lines; and a plurality of connecting units that connect the clock transmission lines to the shift register, respectively, wherein at least one of the connecting unit includes a zigzagged line that overlaps said corresponding clock transmission line, a first overlap preventing hole is provided in a part of the transmission lines overlapped with connecting line of the connecting unit, and a second overlap preventing hole is provided in a corresponding part of the transmission line not overlapped with connecting line of the connecting unit.

* * * * *